US012699844B2

(12) United States Patent
Emrey et al.

(10) Patent No.: US 12,699,844 B2
(45) Date of Patent: Aug. 4, 2026

(54) SYSTEMS AND METHODS FOR DETECTING ERRORS AND HALLUCINATIONS IN GENERATIVE MODEL OUTPUT DATA

(71) Applicant: NOBLIS, INC., Reston, VA (US)

(72) Inventors: Abigail Emrey, Reston, VA (US);
Olivia Amici, Alexandria, VA (US);
Nicholas Bartlow, Morgantown, WV
(US)

(73) Assignee: NOBLIS, INC., Reston, VA (US)

( * ) Notice: Subject to any disclaimer, the term of this patent is extended or adjusted under 35 U.S.C. 154(b) by 139 days.

(21) Appl. No.: 18/667,103

(22) Filed: May 17, 2024

(65) Prior Publication Data

US 2024/0386207 A1      Nov. 21, 2024

Related U.S. Application Data

(60) Provisional application No. 63/467,409, filed on May 18, 2023.

(51) Int. Cl.
*G06F 40/295* (2020.01)
*G06F 40/205* (2020.01)

(52) U.S. Cl.
CPC .......... *G06F 40/295* (2020.01); *G06F 40/205* (2020.01)

(58) Field of Classification Search
CPC .... G06F 3/167; G06F 18/2155; G06F 40/131; G06F 40/166; G06F 40/186; G06F 40/20; G06F 40/205; G06F 40/253; G06F 40/295; G06F 40/30; G06F 40/51; G06F 40/56; G06F 16/334; G06F 40/169; G06F 40/263; G06F 40/35; G06F 40/40; G06N 3/0442; G06N 3/045; G06N 5/046; G06N 20/00; G06N 3/042; G06N 3/08; G06N 3/09; G06N 5/022; G10L 13/02; H04L 27/2613; G06Q 10/00; G06Q 30/063
See application file for complete search history.

(56) References Cited

U.S. PATENT DOCUMENTS

| | | | | |
|---|---|---|---|---|
| 8,688,435 | B2 * | 4/2014 | Nasri ..................... | G06F 40/131 |
| | | | | 704/277 |
| 11,704,488 | B2 * | 7/2023 | Carvalho .............. | G06F 40/263 |
| | | | | 704/9 |
| 11,704,900 | B2 * | 7/2023 | Koukoumidis ........ | G06Q 10/00 |
| | | | | 704/9 |
| 11,714,968 | B2 * | 8/2023 | Batra ....................... | G06N 3/09 |
| | | | | 704/9 |
| 11,769,017 | B1 * | 9/2023 | Gray ....................... | G06F 40/56 |
| | | | | 704/9 |

(Continued)

*Primary Examiner* — Gerald Gauthier
(74) *Attorney, Agent, or Firm* — Morrison & Foerster LLP

(57) ABSTRACT

Provided herein are systems and methods that can detect errors and hallucinations in output data produced by generative models. The detection systems described herein may compare information from the generative model output data with ground truth information to determine whether the generative model output data comprises errors and/or hallucinations. The systems and methods described herein may generate an output indicative of whether the generative model output data comprises errors and/or hallucinations. The systems and methods described herein can readily detect false information generated by NLG systems, thus potential harms of reliance on false information can be minimized.

16 Claims, 4 Drawing Sheets

300

302 — Receive output data from a generative model

304 — Generate a structured representation of the output data

306 — Compare the structured representation of the output data to a fact data structure to determine whether the generative model output data comprises errors or hallucinations 308 — Generate an output indicating the determination

(56)  References Cited

U.S. PATENT DOCUMENTS

| | | | |
|---|---|---|---|
| 11,972,223 B1* | 4/2024 | DeFoor | G06N 20/00 |
| 2003/0212545 A1* | 11/2003 | Kallulli | G10L 13/02 |
| | | | 704/9 |
| 2019/0097858 A1* | 3/2019 | Stuart | H04L 27/2613 |
| 2021/0097232 A1* | 4/2021 | Long | G06F 40/56 |
| 2022/0058345 A1* | 2/2022 | Guo | G06F 40/253 |
| 2022/0164643 A1* | 5/2022 | Charnock | G06N 5/046 |
| 2023/0061906 A1* | 3/2023 | Gaur | G06F 40/30 |
| 2023/0119109 A1* | 4/2023 | Choubey | G06F 18/2155 |
| | | | 706/12 |
| 2023/0135625 A1* | 5/2023 | Wang | G06F 40/35 |
| | | | 704/9 |
| 2023/0146979 A1* | 5/2023 | Gunasekara | G06F 40/205 |
| | | | 704/9 |
| 2023/0153540 A1* | 5/2023 | Galitsky | G06Q 30/0631 |
| | | | 704/9 |
| 2023/0161978 A1* | 5/2023 | Sehanobish | G06N 3/09 |
| | | | 704/9 |
| 2023/0186033 A1* | 6/2023 | Rastogi | G06F 3/167 |
| | | | 704/9 |
| 2023/0196015 A1* | 6/2023 | Coman | G06F 40/169 |
| | | | 704/9 |
| 2023/0206006 A1* | 6/2023 | Nichols | G06N 5/022 |
| | | | 704/9 |
| 2023/0229861 A1* | 7/2023 | Laban | G06F 40/51 |
| | | | 704/9 |
| 2023/0252234 A1* | 8/2023 | Hoang | G06N 3/042 |
| | | | 704/9 |
| 2023/0274086 A1* | 8/2023 | Tunstall-Pedoe | G06F 40/20 |
| | | | 704/9 |
| 2023/0316006 A1* | 10/2023 | Tunstall-Pedoe | G06N 3/0442 |
| | | | 704/9 |
| 2023/0376677 A1* | 11/2023 | Choubey | G06F 40/166 |
| 2024/0256764 A1* | 8/2024 | Maschmeyer | G06F 40/205 |
| 2024/0273309 A1* | 8/2024 | Heller | G06F 40/186 |
| 2024/0338554 A1* | 10/2024 | Schmidt | G06N 3/045 |
| 2024/0354710 A1* | 10/2024 | Logiotatidis | G06F 40/205 |
| 2024/0378400 A1* | 11/2024 | Zhang | G06N 20/00 |
| 2024/0386207 A1* | 11/2024 | Emrey | G06F 40/295 |

* cited by examiner

100

200

300

302 — Receive output data from a generative model

304 — Generate a structured representation of the output data

306 — Compare the structured representation of the output data to a fact data structure to determine whether the generative model output data comprises errors or hallucinations 308 — Generate an output indicating the determination

SYSTEMS AND METHODS FOR DETECTING ERRORS AND HALLUCINATIONS IN GENERATIVE MODEL OUTPUT DATA

CROSS-REFERENCE TO RELATED APPLICATION

This application claims the benefit of U.S. Provisional Application No. 63/467,409, filed May 18, 2023, the entire contents of which are incorporated herein by reference.

FIELD

This relates generally to systems and methods for analyzing generative model output data, and more specifically to systems and methods for detecting errors and hallucinations in generative model output data by comparing generative model output data to factual data.

BACKGROUND

Natural language generation (NLG) systems have the ability to generate humanlike text to answer arbitrary questions, generate documents, and engage in text-based conversation. As NLG systems have rapidly improved over recent years, particularly with the introduction and proliferation of large language models (LLMs), corporations and government organizations see vast potential for knowledge access, increased efficiencies, and scalable creative power.

SUMMARY

As described above, cutting-edge NLG systems are promising a wide range of applications to increase access to information, efficiency in automation of tasks, and creative power. However, these artificial intelligence (AI) systems, particularly those powered by emerging LLM technologies, often generate false information. This false information may include simple factual errors, such as providing an incorrect answer (e.g., the wrong location, the wrong time, the wrong person, etc.), and they may include more complex fabrications of information such as fictitious quotations and fictitious citations. These more complex fabrications of false information are often called "hallucinations."

NLG models themselves have been configured to attempt to maximize the output of accurate information and suppress the output of inaccurate information. However, competing incentives in NLG model design, as well as technological limitations, make inaccurate outputs an unavoidable part of most if not all NLG models. Attempts to integrate fact-detection within NLG systems themselves have introduced limitations to the ability to effectively train and scale said NLG systems, thus leaving the current standard of error detection to be manual human review.

Compounding the problem of factual errors and hallucinations, modern NLG systems can present these falsities in a grammatically and semantically compelling manner, such that the false information is lent the appearance of accuracy and authority. False information generated by an NLG system can be presented confidently by the NLG system and without explanation, visibility, or predictability into why and how the false information was generated. Thus, the possibility that NLG systems may inadvertently generate false information presents business risks and security risks to organizations leveraging NLG systems. Despite great interest in NLG technology, the potential for harm resulting from false information generated by NLG systems thus presents too great a risk for widespread adoption in many sectors.

Accordingly, there is a need for improved systems and methods that can automatically detect factual errors and/or hallucinations in output generated by NLG systems. Because many NLG systems do not offer visibility into the manner in which output text is generated, there is a specific need for systems and methods for automatically detecting factual errors and/or hallucinations in NLG output without requiring visibility into the manner in which the NLG output was generated.

Disclosed herein are systems and methods that can detect errors and hallucinations in output data produced by generative models. The detection systems may be model agnostic and therefore able to receive output data from various generative models (e.g., natural language generation or NLG systems). The detection systems described herein may compare information from the generative model output data with ground truth information to determine whether the generative model output data comprises errors and/or hallucinations. Detected errors in the generative model output data may include statements or other representations in the generative model output that contradict ground truth information. Detected hallucinations may include statements or other representations in the generative model output that are not substantiated by the ground truth information. The systems and methods described herein may generate an output indicative of whether the generative model output data comprises errors and/or hallucinations. The output may indicate (e.g., may highlight or otherwise specify) detected errors and/or hallucinations in the generative model output data, and in some instances may indicate ground truth information contradictory to or in support of utterances in the generative model output data. Using the systems and methods described herein, false information generated by NLG systems can be readily detected, and thus potential harms of reliance on false information can be minimized.

In some embodiments, a system for detecting errors and hallucinations in generative model output data is provided, the system comprising one or more processors configured to cause the system to: receive output data from a generative model; generate a first data structure based on the generative model output data; compare the first data structure to a second data structure, wherein the second data structure represents fact data, to determine whether the generative model output data comprises one or more of an error and a hallucination; based on a determination that the generative model output data comprises the one or more of an error and a hallucination, generate an output indicating the determination.

In some embodiments, determining that the generative model output data comprises an error comprises determining that a portion of the generative model output data contradicts ground truth information used to generate the second data structure.

In some embodiments, determining that the generative model output data comprises a hallucination comprises determining that a portion of the generative model output data is not substantiated by ground truth information used to generate the second data structure.

In some embodiments, the one or more processors are configured to cause the system to generate the second data structure based on ground truth information.

In some embodiments, the ground truth information comprises one or more of inputs of the generative model and authoritative documentation.

In some embodiments, the one or more processors are configured to cause the system to display the generated output indicating the determination.

In some embodiments, the generated output comprises a representation of ground truth information that contradicts the generative model output data.

In some embodiments, the generated output comprises an indication of one or more portions of the generative model output data that is not substantiated by ground truth information.

In some embodiments, the one or more processors are configured to cause the system to, based on a determination that the generative model output data does not comprise the one or more of an error and a hallucination, generate a second output indicating the determination.

In some embodiments, the second generated output comprises a representation of ground truth information that substantiates the generative model output data.

In some embodiments, the one or more processors are configured to cause the system to, based on a determination that the generative model output data comprises the one or more of an error and a hallucination, cause the generative model to generate a new output.

In some embodiments, a method for detecting errors and hallucinations in generative model output data is provided, comprising: receiving output data from a generative model; generating a first data structure based on the generative model output data; comparing the first data structure to a second data structure to determine that the generative model output data comprises one or more of an error and a hallucination; and based on the determination that the generative model output data comprises the one or more of an error and a hallucination, generating an output indicating the determination.

In some embodiments, a non-transitory computer-readable storage medium storing one or more programs for detecting errors and hallucinations in generative model output data, the programs for execution by one or more processors of an electronic device that when executed by the device, cause the device to: receive output data from a generative model; generate a first data structure based on the generative model output data; compare the first data structure to a second data structure to determine whether the generative model output data comprises one or more of an error and a hallucination; and based on a determination that the generative model output data comprises the one or more of an error and a hallucination, generate an output indicating the determination.

In some embodiments, any one or more of the characteristics of any one or more of the systems, methods, and/or computer-readable storage mediums recited above may be combined, in whole or in part, with one another and/or with any other features or characteristics described elsewhere herein.

BRIEF DESCRIPTION OF THE FIGURES

Various aspects of the disclosed systems and methods are set forth with particularity in the appended claims. A better understanding of the features and advantages of the disclosed systems and methods will be obtained by reference to the detailed description of illustrative embodiments and the accompanying drawings.

DETAILED DESCRIPTION

Figure 1:
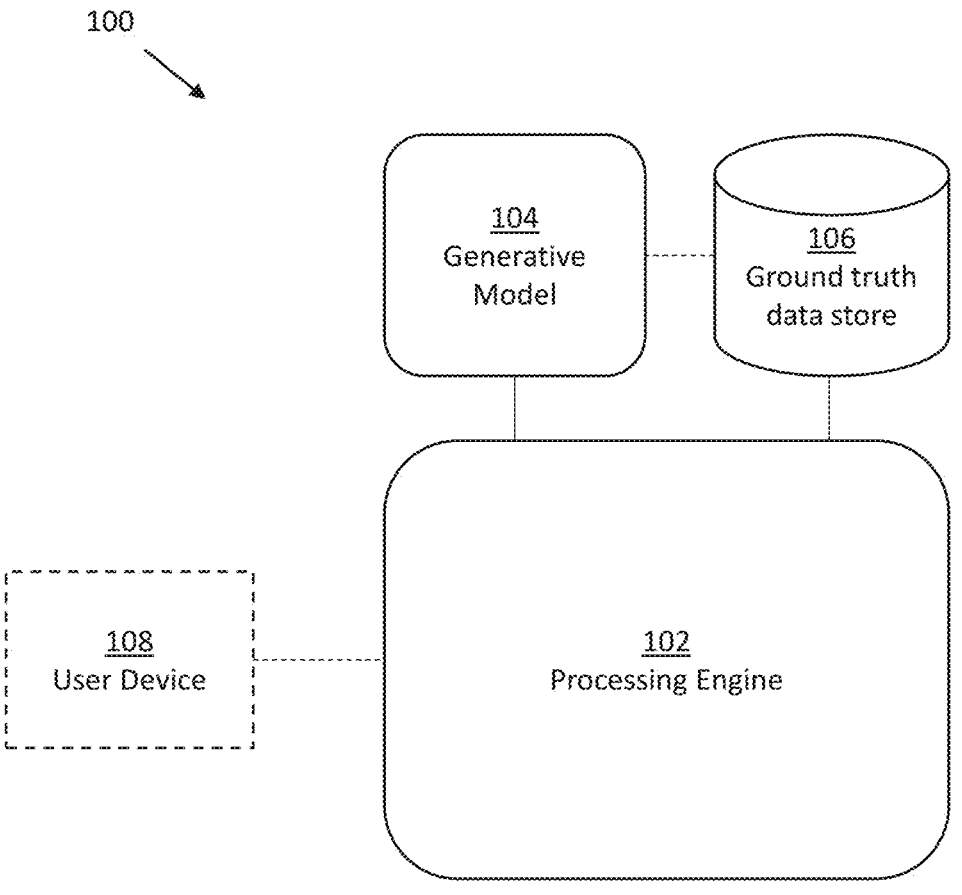
FIG. 1 depicts a system for detecting errors and hallucinations in generative model output data, in accordance with some embodiments.

Systems and methods for detecting errors and hallucinations in generative model output data are described herein. The detection system may include one or more processing engines configured to detect errors and/or hallucinations in generative model outputs. The detection system may be configured to extract information from the output generated by a generative model and to generate a data structure representative of the extracted information. The system may be configured to compare the structured representation of the generative model output data with a structured representation of ground truth data to determine whether the generative model output data includes errors and/or hallucinations. Based on the determination, the system may generate an output indicative of the errors and/or hallucinations in the generative model output data. In the instance the system determines that the generative model output data is free of errors and hallucinations, the output generated by the detection system may comprise an indication of such determination.

The systems and methods described herein may be applied to outputs generated by natural language generation (NLG) systems such as summarization models, question-answering models, LLMs, and chatbots. Thus, the systems and methods disclosed herein may mitigate one or more problems associated with various kinds of generative models. The disclosed systems and methods may be capable of distinguishing between (a) generative model outputs comprising information that is able to be substantiated by ground truth information, (b) hallucinated (e.g., made-up) information that is not able to be substantiated by ground-truth information, (c) information including one or more factual errors that can be affirmatively determined based on ground truth information to be incorrect, and (d) information based on opinions, whether presented as an opinion or presented as a fact. Differentiating between these various different classes of representations is a challenge that existing systems have heretofore failed to adequately address.

The detection systems and methods may be implemented as a "fact-checking" or "verification" step in a pipeline that leverages one or more NLG systems, wherein the fact-checking or verification system can receive outputs of the generative model(s) and detect errors and/or hallucinations in said outputs. The techniques described herein may therefore be provided as an "add-on" system distinct from existing NLG systems, and may be agnostic to the underlying NLG system that is used.

By detecting errors and hallucinations in generative model outputs, risk of harm from reliance on false information can be minimized, and NLG systems may be implemented in situations requiring high levels of confidence in the information generated, such as sensitive business deployments and/or sensitive security deployments. Furthermore, implementation of the systems and methods described herein may increase user trust in NLG systems, leading to opportunities to expand use of NLG into additional fields.

As used herein, errors may refer to output data (or a portion of output data) produced by the generative model that contradicts ground truth information. The errors may be any representations such as conclusions and/or decisions comprising words, phrases, or statements as generated by the generative model that express a position that is contradictory to (e.g., cannot be reconciled with) factual information that is found in ground truth information.

As used herein, hallucinations may refer to output data (or a portion of output data) produced by the generative model that is not substantiated by the ground truth information. In other words, generative model output data may be deemed to be a hallucination if information in the output data appears to have been "made up" by the generative model. Hallucinations may include, for example, fictitious names, fictitious quotations, fictitious locations, fictitious assertions related to factual entities in the output data, and/or fictitious citations. Hallucinations may alternatively or additionally include factual entities (e.g., names, quotations, locations, etc.) and/or factual assertions related to said entities that are not substantiated by input data provided to and/or ground truth data accessible by the generative model.

As used herein, ground truth information may refer to proven or otherwise trusted information or data. This information or data may be referred to as "grounded." The ground truth information may (or may not) be an input to the generative model. The ground truth information may include one or more (e.g., a collection of) trusted or authoritative documents. In some embodiments, the ground truth information may be dependent on the user of the system. In some embodiments, the ground truth information may comprise factual information and/or information based on opinions. In some embodiments, the ground truth information may not necessarily adhere to an absolute truth, but rather may adhere to a "desired" truth representative of the user-curated set of documents from which the ground truth information is based on. The documents used to generate the ground truth information may be variable in format and may undergo additional processing to be converted to raw text usable as input to the system described herein.

As used herein, NLG-generated claims may refer to claims identified or extracted from generative model output data that purport to state (or imply) factual information. It may be unknown, before the further analysis as described herein below, whether an NLG-generated claim is a true claim (proven to be factual based on ground-truth information), an opinion-based claim, or a hallucination.

Exemplary generative models, from which the systems and methods described herein may be configured to receive output data, may include but are not limited to GPT-4, GPT-3.5, GPT-3, GPT-2, GPT, Bing AI chat, YouChat, Google Bard, ChatSonic, XLNet, and/or any other suitable NLG systems. As development of generative models is a field rapidly developing, additional generative models not explicitly listed herein should be understood to be usable with the systems and methods described herein, at least because the disclosed systems and methods are model-agnostic and configured to receive unstructured, open-domain inputs. In some embodiments the system described herein may additionally or alternatively be configured to receive human-generated output data.

FIG. 1 depicts a system 100 for detecting errors and hallucinations in generative model output data, in accordance with some embodiments. System 100 may otherwise be referred to herein as a detection system. As described in detail herein, system 100 may be configured to identify information including NLG-generated claims in generative model output data and compare these NLG-generated claims to ground truth information to determine whether the NLG-generated claims are grounded in trusted factual information.

System 100 may be a computerized system including one or more processors, one or more computer storage mediums, one or more communication devices, and one or more input/output devices. While the components of system 100 are shown, by way of example, in a particular arrangement in FIG. 1, a person of ordinary skill in the art will appreciate, in light of the disclosure herein, that one or more components of system 100 may be combined, provided by multiple separate systems, provided by a single system, and/or provided in a distributed arrangement. In some embodiments, one or more of the data processing functionalities of the various components of system 100 may be provided by a single processor, by a plurality of processors, and/or by a distributed processing system. In some embodiments, one or more of the data storage functionalities of the various components of system 100 may be provided by a single computer storage device (e.g., a single database or RAM), by a plurality of computer storage devices, and/or by a distributed computer storage system.

In the exemplary arrangement shown in FIG. 1, system 100 may include processing engine 102, one or more generative models 104, a ground truth data store 106, and user device 108. In some embodiments, system 100 may not comprise a user input device 108, signified by the dashed lines in the Figure.

Processing engine 102 may comprise one or more computer processors configured to perform one or more of the data processing functionalities described herein. In some embodiments, processing engine 102 may be provided as a local processor or set of processors, and/or as a web-hosted processor or set of processors (e.g., distributed processors). In some embodiments, processing engine may include one or more central processing units (CPUs) and/or graphics processing units (GPUs).

The output generated by processing engine 102 may be stored by any suitable computer storage medium and in any suitable format, such as being provided as a part of one or more databases or RAM of processing engine 102. In some embodiments, the output of processing engine 102 may be stored in an external data storage or memory not explicitly illustrated in FIG. 1.

As shown in FIG. 1, one or more generative models (collectively referred to herein as generative model 104) may be configured such that they are communicatively coupled (e.g., via one or more wired or wireless network communication interfaces) to processing engine 102. System 100 may be configured such that some or all of the output data generated by generative model 104 may be communicated to processing engine 102 for processing as described herein. Namely, processing engine 102 may be configured to operate on output data generated by generative model 104 to determine whether the output data comprises one or more hallucinations and/or errors, and based on the determination, to generate an indication of the determination. For example, processing engine 102 may be configured to generate an indication of the hallucination and/or error. In the instance the output data does not comprise hallucinations or errors, processing engine 102 may be configured to generate an output comprising an indication of such.

Ground truth data store 106 may include data usable by processing engine 102 for evaluation of output data generated by generative model 104. For example, ground truth data store 106 may include factual (e.g., real-world or historical) data, such as documentation from trusted or authoritative sources, usable by processing engine 102 for comparison with the generative model output data. As described herein, in some embodiments, ground truth data store 106 may additionally or alternatively include data derived from opinion, fictional, and/or fabricated sources, usable by the system at least to verify output data from generative model 104 against a fictional ground truth. In some embodiments, information stored in ground truth data store 106 may be usable as input data for generative model 104. In some embodiments, information stored in ground truth data store 106 may be stored in a structured data format that is usable by processing engine 102 for comparisons to structured data extracted from the output data of generative model 104. In some embodiments, information stored in ground truth data store 106 may be stored in a different data format (e.g., as unstructured data) and may be processed by processing engine 102 to transform it into structured data format that is usable by processing engine 102 for comparisons to structured data extracted from the output data of generative model 104.

As shown in FIG. 1, ground truth data store 106 may be configured such that it is communicatively coupled (e.g., via one or more wired or wireless network communication interfaces) to processing engine 102. System 100 may be configured such that some or all of ground truth data store 106 may be communicated to processing engine 102 for processing as described herein. Namely, processing engine 102 may be configured to utilize or extract information from ground truth data store 106 to determine whether output data generated by generative model 104 is based on truthful information.

In some embodiments, system 100 may comprise one or more user devices 108. User device 108 may include any one or more computers or computer systems, such as one or more personal computers, laptops, tablets, smart phones, mobile electronic devices, workstations, or the like. User device 108 may include one or more user input devices (e.g., keyboard, mouse, touch screen, microphone) configured to accept user inputs, and may include one or more displays configured to display information regarding processing of data by processing engine 102. One or more displays of user device 108 may alternatively or additionally be configured to display outputs produced by processing engine 102. In some embodiments, user device 108 may display a graphical user interface that allows a user to monitor the execution by engine 102 of the techniques described herein. The graphical user interface may alternatively or additionally be used to view outputs of the processing engine 102. In some embodiments, a user may be able to use said user interface to enter one or more inputs to configure system 100, such as by setting one or more parameters for executing detection of hallucinations and/or errors as described herein. For example, as described in greater detail below, user device 108 may be used to set one or more threshold levels, input a preferred output type, identify ground truth information (e.g., stored in ground truth data store 106) to be used for error/hallucination detection, etc.

Figure 2:
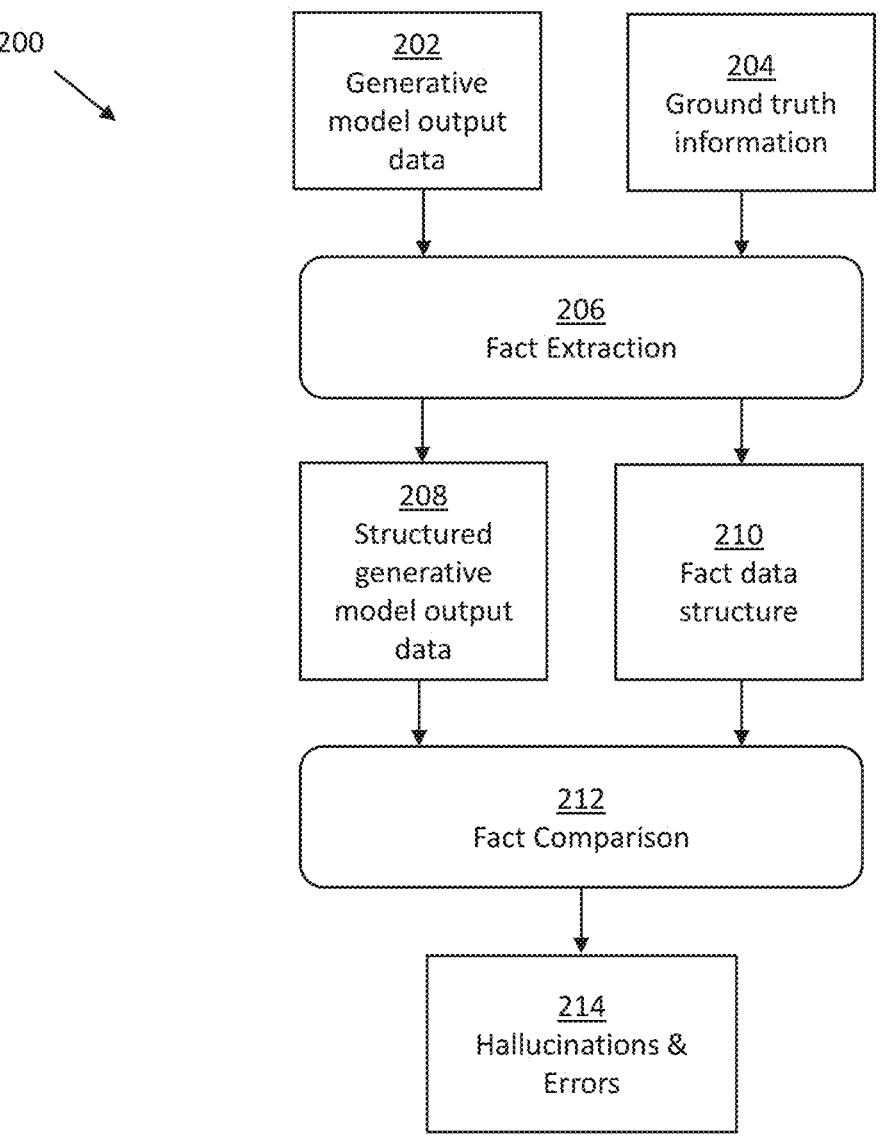
FIG. 2 depicts a block diagram for detecting errors and hallucinations in generative model output data, in accordance with some embodiments.

FIG. 2 depicts a block diagram 200 for detecting errors and hallucinations in generative model output data, in accordance with some embodiments. For example, block diagram 200 may depict the inputs, outputs, and processing stages of processing engine 102 described herein with respect to FIG. 1. In some embodiments, the processing stages illustrated in FIG. 2 (e.g., stages 206, 212, and/or 216) may be embodied in a single processing engine, or alternatively, the processing stages may be embodied in more than one processing engine.

The systems and methods described herein may comprise a pipeline of computational models, algorithms, and/or techniques (e.g., collectively referred to herein, for simplicity, as models) that collectively determine whether generative model output data comprises hallucinations and/or errors. The models may be grouped in stages, each stage configured to receive inputs, process the inputs, and generate an output based on the inputs. As mentioned above, each of the stages 206, 212, and/or 216 may be embodied in one or more processing engines (e.g., processing engine 102, otherwise referred to herein as processors). Accordingly, the models may be embodied in or executed by one or more processors, such as processing engine 102.

Block diagram 200 illustrates a series, or pipeline, of stages within the system to detect hallucinations and/or errors in generative model output data. The stages of the system may comprise fact extraction stage 206, fact comparison stage 212, and, optionally, generative model output correction stage 216, each of which are described in greater detail below.

Fact Extraction

The fact extraction stage 206 may comprise one or more data processing models, algorithms, and/or other techniques configured to receive an input and generate an output by processing the input. One or more processors of fact extraction stage 206 may be configured to receive inputs such as generative model output data 202 and ground truth information 204. Using the generative model output data 202 and ground truth information 204, one or more processors of fact extraction stage 206 may be configured to generate structured data outputs such as data structure 208 representing generative model output data and data structure 210 representing fact data, described in greater detail below.

Generative model output data 202 may comprise outputs produced by a generative model. Example types of natural language generation models that be used herein include summarization models, question-answering models, etc., examples of which are provided above. The generative model output data 202 may comprise open-domain and/or unstructured text (e.g., "raw text") produced by the generative model. In some embodiments, generative model output data 202 may be received by one or more processors of fact extraction stage 206 in a format that would otherwise be provided to a user interacting with the generative model (e.g., via a user device). The generative model output data 202 may comprise one or more of natural language words, sentences, utterances (e.g., phrases), paragraphs, conclusions, and/or decisions. The system may be configured such that it can receive generative model outputs from a variety of generative models (e.g., natural language generation, or NLG, systems). Different generative models may generate outputs that vary in structure. For example, an output produced by a summarization generative model may be different from that produced by a question-answering generative model. Thus, the system (e.g., fact extraction stage 206) may be "model-agnostic."

As described herein, ground truth information 204 may comprise authoritative documentation or other data sources, such as factual information sources and/or opinion-based information sources. Stated otherwise, ground truth information 204 may comprise historical/real-world data and/or data derived from opinion, fictional, and/or fabricated sources. The data store from which ground truth information 204 is retrieved may be continuously updated and/or modified with new information that can be utilized by the system. The ground truth information 204 may comprise unstructured and/or open-domain data. Ground truth information 204 may be received by one or more processors applying data processing operations at fact extraction stage 206 in a raw text format, similar to as described above with respect to generative model output data 202.

Although illustrated in parallel in FIG. 2, it is to be understood that generative model output data 202 and ground truth information 204 could reasonably be received by one or more processors of fact extraction stage 206 simultaneously and/or in sequence, however, it is not a requirement of the system. For example, one or more processors of fact extraction stage 206 may continuously receive or access ground truth information 204 (e.g., stored in ground truth data store 106 illustrated in FIG. 1), and intermittently (e.g., randomly) receive generative model output data 202, or vice versa. The illustration in block diagram 200 of FIG. 2 is not intended to depict timing at which the inputs are received and/or the outputs are provided, but rather merely to illustrate the potential inputs and/or outputs of the stages in a time-independent manner.

The one or more processors applying data processing operations at fact extraction stage 206 may be configured to extract information from the generative model output data 202 and generate a structured representation of the information. More specifically, the system may be configured to extract or identify portions of the generative model output data 202 (e.g., utterances) that comprise NLG-generated claims, such as assertations made by the generative model that may or may not be true. Fact extraction stage 206 may comprise one or more natural language processing (NLP) models configured to extract entities, relationships between entities, and constraints defining the semantic context of the generative model output data 202 (or portions of the generative model output data 202). Example NLP models that may be incorporated in fact extraction stage 206 include but are not limited to named entity recognition models, coreference resolution models, and/or syntactic/semantic parsing models.

Any of the models encompassed in fact extraction stage 206 may be configured to receive an identical or substantially identical input, such as generative model output data 202 and/or ground truth information 204, and may process the data to generate different types of outputs. One or more processors of fact extraction stage 206 may be configured to receive and process open-domain and/or unstructured data (e.g., text) inputs. In some embodiments, the input data received by the system may be pre-processed, or fact extraction stage 206 may comprise one or more pre-processing models to process the received input data prior to further (e.g., substantive) processing of the data. Pre-processing may include segmentation, tokenization, stemming, lemmatization, parts-of-speech (POS) tagging, and/or other NLP pre-processing techniques known to one of ordinary skill in the art.

The one or more processors at fact extraction stage 206 may use the pre-processed data (e.g., generative model output data 202 and/or ground truth information 204) to identify factual information and/or assertations (e.g., NLG-generated claims). For example, the one or more processors may apply one or more named entity recognition (NER) models to receive the (pre-processed) generative model output data 202 and identify or extract entities from the output data that form part of one or more NLG-generated claims in the output data 202. The entities may comprise individual tokens and/or may be encompassed in an utterance (e.g., span) comprising one or more entities and/or other related tokens. Entity extraction may be executed in a variety of manners. For example, named entity recognition (NER) models may utilize databases (e.g., dictionaries) describing entities to determine whether a given entity should be extracted. NER models may additionally or alternatively use a set of rules (e.g., pattern-based rules and/or context-based rules) that are configured to guide information extraction. In some embodiments, the NER models of fact extraction stage 206 may additionally or alternatively comprise one or more machine learning (ML)-based models that are trained to detect/extract entities of interest. The ML models may be trained using labeled or unlabeled training data, such as specialized NER corpora and/or large-scale general text resources. In some embodiments, the training data may be representing generative model output data and/or ground truth fact data as well as corresponding data structures representing said generative model output data and/or ground truth fact data. Example NER pipelines that may be utilized herein to extract entities include but are not limited to Spacy, NLTK, flair, and/or Stanford CoreNLP pipelines. In some embodiments, fact extraction stage 206 may utilize NLU APIs such as Google's Natural Language API or Azure's Cognitive Services API. In some embodiments, fact extraction stage 206 may include specific natural language understanding models (e.g., BERT, RoBERTa, GPT-n, T5, transformer, and their derivatives) that have been trained or otherwise directed to extract entities as desired.

The one or more processors of fact extraction stage 206 may be configured to not only detect and extract entities from inputs, but also optionally to categorize the extracted entities. For example, whether a given entity can be categorized as a sentiment word, which may aid the system in later determining that the corresponding utterance is based in opinion (as opposed to fact), may be determined using NER models. Other examples of categorization that may be applied at the fact extraction stage 206 described herein may include but are not limited to categorization based on whether the entity refers to an organization, person, location, time, quantity, monetary amount, calendar date, percentage, language, law, event, work of art, geopolitical entity, product, etc.

Regardless of the type of NER model(s) used to identify entities, the one or more processors of fact extraction stage 206 may generate data structure(s) that comprise an indication of one or more named entities in the generative model output data and/or in the ground truth information. The generated data structure(s) may indicate additional characteristics of the extracted entity/entities.

As described herein, one or more processors configured to apply data processing operations at fact extraction stage 206 may be configured to apply one or more coreference resolution models. The coreference resolution models may receive a pre-processed input as described above with respect to the input of the named entity recognition (NER) models. The pre-processed input (e.g., generative model output data 202 and/or ground truth information 204) may be received by the one or more coreference models as individual tokens and/or as an utterance comprising a span of tokens. The system may group, or cluster, the received tokens based on the entity to which they refer. In some embodiments, coreference resolution models may use as input the output of one or more NER models that have identified entities. In some embodiments, conference resolution models may also identify entities in a similar manner as described above with respect to the NER models. The coreference resolution models of fact extraction stage 206 may generate a data structure output that comprises an indication of various pronouns or other linguistic expressions in the generative model output data 202 related to a given extracted entity. For example, the data structure generated by one or more coreference resolution models of fact extraction stage 206 may comprise a graph of nodes and edges, whereby the nodes are representative of extracted entities and the edges indicate relationships between the entities. Coreference resolution models may be trained using labeled and/or unlabeled training data, such as specialized NER corpora and/or large-scale general text resources. In some embodiments, the training data may be representative of generative model output data 202 and/or ground truth information 204 and corresponding structured data.

Fact extraction stage 206 may comprise syntactic and/or semantic parsing models. Semantic parsing models may be configured to receive the input data, such as generative model output data 202 (which may in some embodiments be pre-processed), and determine the meaning of the input. Syntactic parsing models may in a similar manner be configured to determine the meaning of an input (e.g., generative model output data 202), but with particular attention paid to the arrangement of words and the grammar in the input. The syntactic and semantic models may individually generate outputs and/or may generate a single combined output based on a given input. Semantic and syntactic parsing models may be trained using labeled and/or unlabeled training data, such as specialized NER corpora and/or large-scale general text resources. In some embodiments, the training data may be representative of the generative model output data 202 and/or ground truth information 204.

The outputs from one or more of any of the aforementioned models of fact extraction stage 206 may be combined to create a combined structured data output that is output from fact extraction stage 206. For example, for a given generative model output data 202 that is provided as input to the one or more models embodied in fact extraction stage 206, a combined output or a combined related collection of outputs comprising a characteristic data structure may be generated. This combined output or combined related collection of outputs may constitute all or part of data structure 208 representing generative model output data. The data structure 208 representing generative model output data may be stored in an internal data store (e.g., RAM) and/or external data store. In a similar manner, for ground truth information 204 that is provided as input to the one or more models embodied in fact extraction stage 206, a combined output or combined related collection of outputs comprising a similarly structured data structure (to allow for comparison, as described in greater detail herein) may be generated. This combined output or combined related collection of outputs may constitute all or part of data structure 210 representing fact data. A given data structure 210 representing fact data may characterize a single fact, a collection of facts (e.g., related facts), a single authoritative document, or a collection of documents (e.g. related documents). Collection of related documents may in some embodiments be related to a given organization, corporation, government body, or the like.

In some embodiments, a data structure generated by the system at fact extraction stage 206 may comprise a resource description framework (RDF) triple or other similar data structure. The system may be configured to generate an RDF triple for each utterance extracted from the input data (e.g., generative model output data 202 and/or ground truth information 204). The RDF triple may describe relationships between entities in a structured manner. RDF triples may be connected to one another in a graph data structure of nodes and edges. For example, a knowledge graph representative of a given generative model output data 202 may be generated which informs extracted entities, relationships between entities, contextual information of the output, and/or other data associated with the generative model output data 202. The data structure may in some embodiments comprise additional metadata related to the system input (e.g., generative model output data 202 and/or ground truth information 204). For example, a generated data structure 210 representing fact data may comprise data regarding the source of the information, the time/date at which the information was retrieved, the time/date at which the information was publicly accessible, etc. The metadata may be processed and stored such that the metadata is associated with the RDF triple.

In some embodiments, the one or more processing engines executing the pipeline illustrated in FIG. 2 may first determine whether an existing data structure 210 representing fact data exists (e.g., stored in ground truth data store 204) for comparison to a received data structure 208 representing generative model output data, prior to retrieving related ground truth information 204 and processing the information to generate data structure 210 representing fact data. Determination of whether a data structure 210 suitable for verification of generative model output data already exists may include performing one or more comparisons (e.g., as described below) using existing data structures 210; if it is determined that insufficient information exists to verify or refute a purported fact from the generative model output data (e.g., the purported fact appears to be a hallucination), then the system may in some embodiments systematically retrieve additional fact data, generate additional data structures 210, and perform additional comparisons using the newly-generated data structures 210. Thus, the system (e.g., one or more processors of fact extraction stage 206) may generate data structures 210 ad-hoc (e.g., as needed) for comparison with generative model output data 202. The data structures 210 generated by the system may be stored in an internal or external data store such that the data structures can later be utilized to compare with newly generated data structure 208 representing generative model output data. In some embodiments, the one or more processing engines may, for each instance generative model output data 202 is received, retrieve and process related ground truth information 204 to generate a new data structure 210 representing fact data for comparison with the data structure 208 representing generative model output data generated by the system.

The data structure 208 representing generative model output data and data structure 210 representing fact data generated by one or more processors of fact extraction stage 206 may be provided to one or more processors applying one or more data processing operations at the fact comparison stage 212 configured to compare and assess whether the data structure 208 representing generative model output data comprises hallucinations and/or errors, described in greater detail below.

Fact Comparison

The fact comparison stage 212 may comprise one or more data processing operations, algorithms, and/or other techniques configured to receive an input and generate an output by processing the input. One or more processors of fact comparison stage 212 may be configured to receive inputs such as data structure 208 representing generative model output data and data structure 210 representing fact data.

Using the data structure 208 and data structure 210, the system may generate an output 214 indicating one or more hallucinations and/or errors, described in greater detail below.

Although not explicitly illustrated in FIG. 2, in some embodiments, one or more processors of fact comparison stage 212 may receive previously stored inputs (e.g., stored in an external data store, such as ground truth data store 106, and/or internal data store). For example, in some embodiments, the data structure 210 representing fact data illustrated in the block diagram 200 of FIG. 2 may not be directly from the fact extraction stage 206, but rather may be generated by models of the fact extraction stage 206, stored for a duration of time, and later retrieved by one or more processors of fact comparison stage 212 for comparison with data structure 208 representing generative model output data.

One or more processors of fact comparison stage 212 may be configured to compare the data structure 208 representing generative model output data with a data structure 210 representing fact data to determine whether the generative model output data 202 comprises one or more of a hallucination and/or error. Fact comparison stage 212 may comprise one or more natural language understanding (NLU) models, such as natural language inference (NLI) models. The models may be configured to determine a similarity measure that characterized similarity or dissimilarity of the data structure 208 representing generative model output data and the data structure 210 representing fact data. Specifically, NLI models may determine the degree of entailment between a premise (e.g., fact data structure 210) and a hypothesis (e.g., structured generative model output data 208), thereby determining not only similarities between the data structures, but also logical entailment, contradiction, and/or lack thereof. It should be understood that while this application describes making various determinations (e.g., as to whether an error or hallucination is present) based on a determined degree of similarity, the same determinations may be made additionally or alternatively based on a determined degree of entailment. Exemplary NLU models that may be used to detect similarities between the data structures include but are not limited to DeBERTa, RoBERTa, BERT, T5, transformer, and/or derivative models. Detecting the degree of similarity between information in each of the data structures may comprise determining differences between data points (e.g., data values, nodes, etc.) in the data structures. For example, known methods of determining distances between data structures, such as Hamming distances, Levenshtein distances, and other distance-based algorithms known by one of ordinary skill in the art may be used to determine the similarity between the data structure 208 representing generative model output data and data structure 210 representing fact data. These text similarity measures may be used to identify pairs of data structures 208 and 210 to be provided to NLI models, which in turn may determine whether generative model output data 202 is substantiated by ground truth information 204.

The system may be configured to compare data structure 208 representing generative model output data against data structure 210 representing fact data (or vice versa) in any reasonable manner, including by comparing individual data points, multiple data points, and/or all data points in one or more of the data structures. For example, the data structure 208 representing generative model output data may be compared to the data structure 210 representing fact data in a one-to-one manner (e.g., one data point from the data structure 208 representing generative model output data compared to one data point from the data structure 210 representing fact data), in a one-to-many manner (e.g., one data point from the data structure 208 representing generative model output data compared to more than one data point from the data structure 210 representing fact data), and/or in a many-to-many manner (e.g., multiple data points from a first one of the data structures may each be compared to multiple data points from the second one of the data structures).

Data points within data structure 208 representing generative model output data (e.g., representative of utterances, individual entities, etc.) may be assigned a comparison score based on the comparison to data structure 210 representing fact data. In some embodiments, individual data points may be assigned a score that can be compiled (e.g., using a weighted or unweighted sum) with that of related data points to determine an overall comparison score for a given portion of data structure 208 representing generative model output data as compared to data structure 210 representing fact data. An overall comparison score may additionally or alternatively be computed using a distance calculation that computes a distance between the two data structures being compared in multidimensional space, wherein the distance calculation is based on a weighted or unweighted sum of the data points (or, e.g., of squares thereof) for each data structure.

The overall comparison score may be measured against one or more thresholds to determine whether the data structure 208 representing generative model output data meets or exceeds a standard for similarity (or dissimilarity) relative to data structure 210 representing fact data. For example, the one or more processors of fact comparison stage 212 may utilize one or more thresholds to distinguish whether one or more data points of data structure 208 representing generative model output data is very similar, moderately similar, moderately dissimilar, or very dissimilar from the data structure 210 representing fact data. Exemplary thresholds may be about 75% or greater similarity for data points which are very similar, about 50-75% similarity for data points which are moderately similar, about 25-50% similarity for data points which are moderately dissimilar, and about 0-25% similarity for data points which are very dissimilar. In some embodiments, a threshold of similarity vs. dissimilarity may be dichotomous, e.g., scores greater than or equal to about 50% may indicate similarity, whereas scores below about 50% may indicate dissimilarity. Other threshold bounds, whether expressed as a percentage, a value, etc. may additionally or alternatively be employed as will be understood by one of ordinary skill in the art. In some embodiments, the thresholds by which similarity is assessed may be updated and/or modified automatically and/or manually (e.g., by a user via user device 108).

As described herein, NLI models of the fact comparison stage 212 may be configured to receive indications of pairs of data structures 208 and 210 which meet or exceed a similarity standard. The NLI models may be configured to classify the pairs of data structures, e.g., based on whether the structured generative model output data 208 is substantiated by, contradicts, or lacks any logical relation (or entailment) to fact data structure 210. Using this classification, errors and/or hallucinations in the generative model output data 202 can be determined.

Whether data structure 208 representing generative model output data is substantiated by and/or contradictory of data structure 210 representing fact data may be indicative of whether the generative model output data 202 comprises hallucinations and/or errors. As used herein, hallucinations refer to portions of data (e.g., text) in the generative model output data 202 that is not substantiated by data in ground truth information 204. In other words, hallucinations can be representations of fact made by the generative model that appear to be fictitious. In a similar manner, errors can be portions of data (e.g., text) in the generative output data 202 that contradict data in ground truth information 204. In some embodiments, an error in generative model output data 202 may comprise an expression of which at least one portion comprises information substantiated by ground truth information 204, and of which at least another portion comprises information not substantiated by ground truth information 204.

Based on the comparison between data structure 208 representing generative model output data and data structure 210 representing fact data, the one or more processors of fact comparison stage 212 may generate an output 214 indicative of identified hallucinations and/or errors. The output 214 may be provided in a machine-readable and/or user-readable (e.g., user-friendly) format. For example, the system may be configured to generate an output configured to be provided to a natural language generation (NLG) system (e.g., generative model 104) such that the NLG system can use the generated output comprising detected errors and/or hallucinations to correct the corresponding generative model output that is to be provided to users and provide the corrected output to users of the NLG system. In some embodiments, the detected errors and/or hallucinations output 214 may be used to train the NLG system to mitigate future error and/or hallucination generation by the generative model.

In some embodiments, in addition to or instead of providing the hallucination and/or error output 214 to the generative model 104, the system described herein may be configured to receive the output (e.g., an initial output) indicating, in a structured machine-readable format, the hallucinations and/or errors in the data structure 208 representing generative model output data. Based on this structured data, the system may be configured to generate a human-readable output, comprising for example human-readable text and/or one or more visualizations generated based on the identified errors and/or hallucinations 214. The hallucinations/errors output 214 may comprise an indication of errors and/or hallucinations detected in the originally received generative model output data 202. For example, the output may comprise an annotated version of the generative model output data 202 comprising annotations that indicate errors and/or hallucinations. In some embodiments, the errors/hallucinations output 214 may comprise references to ground truth information (e.g., data sources) that support and/or contradict portions of the generative model output data 202. In some embodiments, the system may be configured to determine whether a given data source is credible or opinion-based, or in some embodiments such data may be provided by a user. For example, as described herein, ground truth information 204 may comprise each of fact-based data and opinion-based data, and these data types may be indicated as such. Additionally or alternatively, one or more processors of fact extraction stage 206 may be configured to detect opinionated spans of text in inputs (e.g., generative model output data 202). In either instance, the hallucinations/errors output 214 may comprise an indication of whether the data source which substantiates and/or contradicts the portion of the generative model output data 202 is fact- or opinion-based. The output 214 may be displayed to a user (e.g., via user device 108) and/or provided to the corresponding NLG system (e.g., generative model 104, as mentioned above) to allow a user device communicatively coupled to the NLG system to display the hallucinations/ errors output 214.

In some embodiments, the system may determine, based on the data structure 208 representing generative model output data and data structure 210 representing fact data, that the data structure 208 representing generative model output data does not comprise hallucinations or errors. In a similar manner as described above with indications of errors and/or hallucinations in the generative model output data 202, the system may be configured to provide an output (e.g., to a user via user device 108 and/or to a corresponding generative model 104) indicating that one or more portions of the generative model output data 202 do not comprise errors or hallucinations and are therefore substantiated (e.g., supported) by ground truth information 204. For example, as described above, the output may comprise indications of sources (e.g., citations) by which the generative model output data 202 is substantiated. The sources may be credible, factual sources and/or opinion-based sources, and thus the indications may denote such. In some embodiments, the output 214 may alternatively or additionally comprise binary (e.g., yes-no, 0-1, etc.) outputs indicating whether portions of generative model output data 202 are substantiated by ground truth information 204.

In some embodiments, the use of the systems and methods described herein may extend beyond machine-generated natural language outputs as input to human-generated (or partially-human generated) text as input. For example, fact extraction stage 206 may receive an input comprising human-generated text. One or more processors of fact extraction stage 206 may process the human-generated text to detect entities, relationships between entities, and/or constraints defining contextual information related to the human-generated text. The system may be configured to, based on the input human-generated text, generate a structured representation of the human-generated text that can be compared with data structures 210 (e.g., via one or more processors of fact comparison stage 212). The system may be configured to detect errors and/or hallucinations in the structured representation of the human-generated input text based on one or more similarity measures between the data structures. The generated hallucinations and/or errors output 214 may be provided to a user in a similar manner as described above.

In some embodiments, the system may be configured to, in response to identifying one or more errors or hallucinations in output data received from a generative model, automatically cause the generative model to generate a new output. The newly generated output may then be analyzed by the system to determine whether it contains any errors or hallucinations. This iterative process of requesting a new output from the generative model and analyzing said new output may repeat until an output generated by the generative model is free of errors and hallucinations, until a sufficiently small number or errors and hallucinations are detected in the output, until a maximum time is exceeded, until a maximum number of iterations are exceeded, until a maximum amount of processing resources are expended, and/or until any other suitable cessation condition is met.

Figure 3:
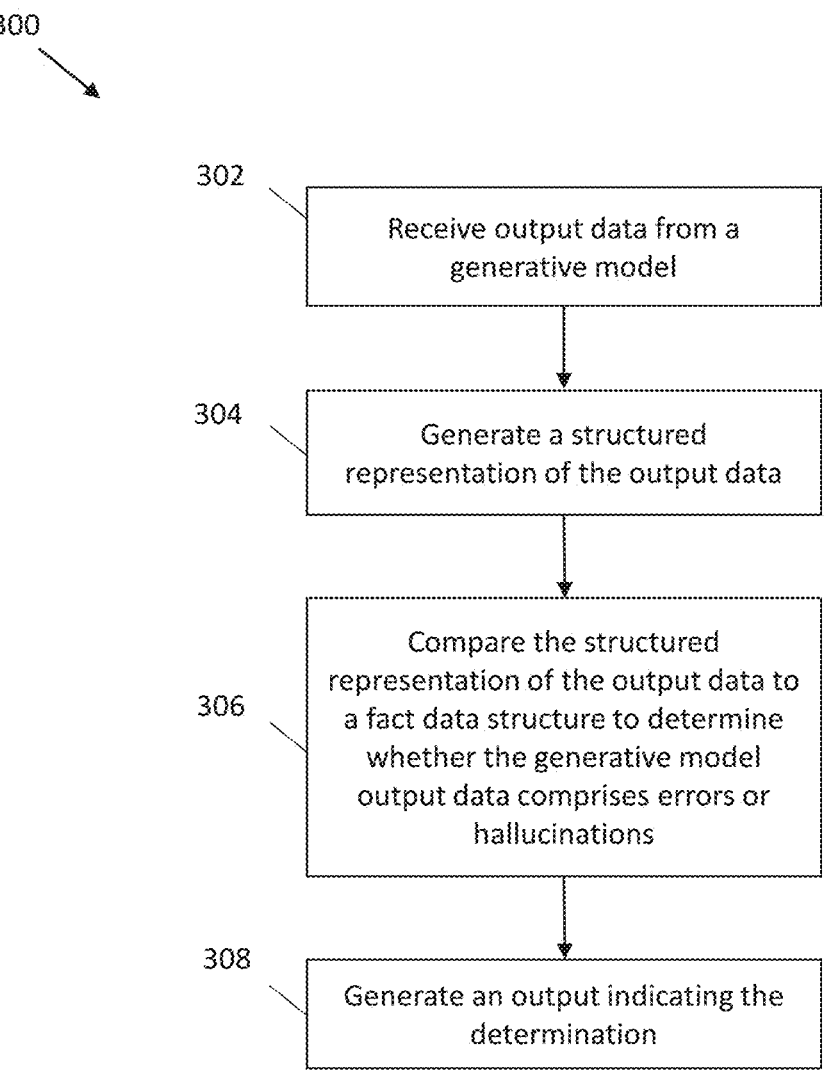
FIG. 3 depicts a method for detecting errors and hallucinations in generative model output data, in accordance with some embodiments.

FIG. 3 depicts a method 300 for detecting errors and hallucinations in generative model output data, in accordance with some embodiments. At block 302, the system may receive output data from a generative model. In some embodiments, the system may additionally receive ground truth information (e.g., from a ground truth data store, such as ground truth data store 106 illustrated in FIG. 1). The ground truth information may comprise inputs of the generative model and/or authoritative documentation.

At block 304, the system may generate a structured representation of the output data, otherwise referred to herein as structured data representing generative model output data. The system may utilize one or more natural language processing (NLP) models that are configured to detect entities, relationships between entities, and/or constraints defining contextual information related to the generative model output data. The outputs from the NLP models may be combined in a data structure usable for further processing by the systems provided herein. In some embodiments, the system may additionally generate a structured representation of fact data (e.g., data structure 210 representing fact data described herein with respect to FIG. 2) based on the received ground truth information. The structured representation of fact data may be generated in a similar manner as described herein with respect to the structured representation of the generative model output data.

At block 306, the system may compare the structured representation of the output data to the structured representation of fact data to determine whether the generative model output data comprises errors and/or hallucinations. Comparing the structured data representing generative model output data to the structured data representing the fact data may comprise determining a similarity measure between the data structures. In some embodiments, determining that the generative model output data comprises an error may comprise determining that a portion of the generative model output data contradicts the ground truth information used to generate the structured representation of fact data. In some embodiments, determining that the generative model output data comprises a hallucination may comprise determining that a portion of the generative model output data is not substantiated by the ground truth information used to generate the structured representation of fact data.

At block 308, the method 300 may alternatively or additionally comprise generating an output indicating that the generative model output data does or does not comprise an error and/or hallucination. The generated output may comprise an indication of the errors and/or hallucinations in the generative model output data. In the instance a portion of the generative model output data comprises an error, the generated output may comprise a representation of ground truth information that contradicts the generative model output data. In the instance the generative model output data does not comprise errors and/or hallucinations, the system may generate an output (e.g., a second output) indicating such determination. This second output may in some embodiments comprise a representation of ground truth information that substantiates the generative model output data.

In some embodiments, the method 300 may comprise displaying to a user and/or providing to the generative model the generated output indicating the determination that the generative model output data does or does not comprise an error and/or hallucination.

Figure 4:
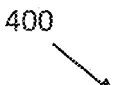
FIG. 4 depicts a computer, in accordance with some embodiments.
Figure 4:
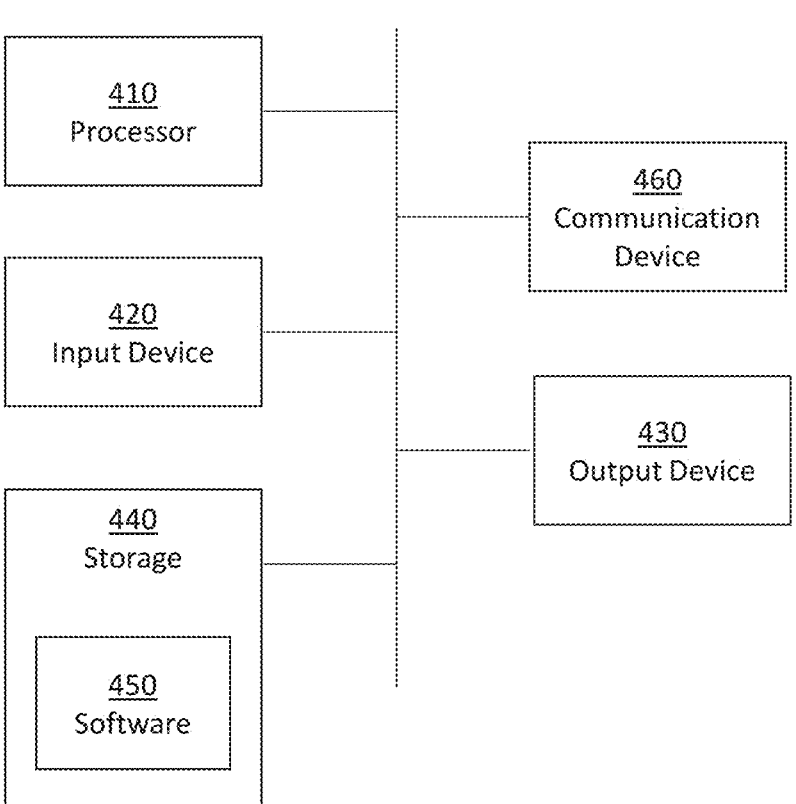

FIG. 4 illustrates a computer, in accordance with some embodiments. Computer 400 can be a component of an error and/or hallucination detection system, such as system 100 and/or any of its subcomponents described above with reference to FIG. 1. In some embodiments, computer 400 may be configured to execute a method for automatically generating computer programs, such as all or part of method 300. In some embodiments, computer 400 may be configured to execute any of the other techniques discussed herein, alone and/or in combination with one another and/or with method 300.

Computer 400 can be a host computer connected to a network. Computer 400 can be a client computer or a server. As shown in FIG. 4, computer 400 can be any suitable type of microprocessor-based device, such as a personal computer; workstation; server; or handheld computing device, such as a phone or tablet. The computer can include, for example, one or more of processor 410, input device 420, output device 430, storage 440, and communication device 460.

Input device 420 can be any suitable device that provides input, such as a touch screen or monitor, keyboard, mouse, or voice-recognition device. Output device 430 can be any suitable device that provides output, such as a touch screen, monitor, printer, disk drive, or speaker.

Storage 440 can be any suitable device that provides storage, such as an electrical, magnetic, or optical memory, including a RAM, cache, hard drive, CD-ROM drive, tape drive, or removable storage disk. Communication device 460 can include any suitable device capable of transmitting and receiving signals over a network, such as a network interface chip or card. The components of the computer can be connected in any suitable manner, such as via a physical bus or wirelessly. Storage 440 can be a non-transitory computer-readable storage medium comprising one or more programs, which, when executed by one or more processors, such as processor 410, cause the one or more processors to execute methods described herein, such as all or part of method 300.

Software 450, which can be stored in storage 440 and executed by processor 410, can include, for example, the programming that embodies the functionality of the present disclosure (e.g., as embodied in the systems, computers, servers, and/or devices as described above). In some embodiments, software 450 can be implemented and executed on a combination of servers such as application servers and database servers.

Software 450 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 440, that can contain or store programming for use by or in connection with an instruction execution system, apparatus, or device.

Software 450 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computer 400 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines. Computer 400 may be composed of components which are interconnected across a network, such as a distributed system. Computer 400 may be organized into any suitable topology, such as a star topology, a recursively defined topology, a mesh topology, a ring topology, or an ad-hoc topology.

Computer 400 can implement any operating system suitable for operating on the network. Software 450 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

What is claimed is:

1. A system for detecting errors and hallucinations in generative model output data, the system comprising one or more processors configured to cause the system to:

receive output data from a generative model;

generate a first data structure based on the generative model output data, wherein the first data structure comprises a first graph comprising a first plurality of nodes and a first plurality of edges;

compare the first data structure to a second data structure, wherein the second data structure represents fact data, to determine whether the generative model output data comprises one or more of an error and a hallucination;

based on a determination that the generative model output data comprises the one or more of an error and a hallucination, generate an output indicating the determination.

2. The system of claim 1, wherein determining that the generative model output data comprises an error comprises determining that a portion of the generative model output data contradicts ground truth information used to generate the second data structure.

3. The system of claim 1, wherein determining that the generative model output data comprises a hallucination comprises determining that a portion of the generative model output data is not substantiated by ground truth information used to generate the second data structure.

4. The system of claim 1, wherein the one or more processors are configured to cause the system to generate the second data structure based on ground truth information.

5. The system of claim 4, wherein the ground truth information comprises one or more of inputs of the generative model and authoritative documentation.

6. The system of claim 1, wherein the one or more processors are configured to cause the system to display the generated output indicating the determination.

7. The system of claim 1, wherein the generated output comprises a representation of ground truth information that contradicts the generative model output data.

8. The system of claim 1, wherein the generated output comprises an indication of one or more portions of the generative model output data that is not substantiated by ground truth information.

9. The system of claim 1, wherein the one or more processors are configured to cause the system to, based on a determination that the generative model output data does not comprise the one or more of an error and a hallucination, generate a second output indicating the determination.

10. The system of claim 9, wherein the second generated output comprises a representation of ground truth information that substantiates the generative model output data.

11. The system of claim 1, wherein the one or more processors are configured to cause the system to, based on a determination that the generative model output data comprises the one or more of an error and a hallucination, cause the generative model to generate a new output.

12. The system of claim 1, wherein each node of the first plurality of nodes represents a respective extracted entity of the generative model output data and each edge of the first plurality of edges represents a relationship between two of the extracted entities.

13. The system of claim 1, wherein each node of the first plurality of nodes represents a respective resource description framework triple, and wherein each resource description framework triple is associated with a respective extracted entity of the generative model output data.

14. The system of claim 1, wherein the second data structure comprises a second graph comprising a second plurality of nodes and a second plurality of edges, wherein one or more nodes of the second plurality of nodes represents a respective resource description framework triple associated with a respective extracted entity of the fact data.

15. A method for detecting errors and hallucinations in generative model output data, comprising:

receiving output data from a generative model;

generating a first data structure based on the generative model output data, wherein the first data structure comprises a first graph comprising a first plurality of nodes and a first plurality of edges;

comparing the first data structure to a second data structure to determine that the generative model output data comprises one or more of an error and a hallucination; and based on the determination that the generative model output data comprises the one or more of an error and a hallucination, generating an output indicating the determination.

16. A non-transitory computer-readable storage medium storing one or more programs for detecting errors and hallucinations in generative model output data, the programs for execution by one or more processors of an electronic device that when executed by the device, cause the device to:

receive output data from a generative model;

generate a first data structure based on the generative model output data, wherein the first data structure comprises a first graph comprising a first plurality of nodes and a first plurality of edges;

compare the first data structure to a second data structure to determine whether the generative model output data comprises one or more of an error and a hallucination; and based on a determination that the generative model output data comprises the one or more of an error and a hallucination, generate an output indicating the determination.

\* \* \* \* \*